United States Patent [19]
Rawlence et al.

[11] Patent Number: 5,238,675
[45] Date of Patent: Aug. 24, 1993

[54] GALLIUM ZEOLITES

[75] Inventors: David J. Rawlence, Cuddington; Khalid Karim; John Dwyer, both of Manchester, all of Great Britain

[73] Assignee: Unilever Patent Holdings B.V., Rotterdam, Netherlands

[21] Appl. No.: 682,731

[22] Filed: Apr. 9, 1991

[30] Foreign Application Priority Data

Apr. 9, 1990 [GB] United Kingdom ............... 9008038

[51] Int. Cl.$^5$ .............................................. C01B 33/34
[52] U.S. Cl. ..................................... 423/713; 423/715; 423/DIG. 21; 502/61; 502/79; 502/86; 208/120
[58] Field of Search ............... 502/60, 61, 64, 77, 502/79, 85, 86; 423/328, 329, 118, 700, 713, 715, 21

[56] References Cited

U.S. PATENT DOCUMENTS

| | | | |
|---|---|---|---|
| 4,520,118 | 5/1985 | Gane et al. | 502/61 |
| 4,524,140 | 6/1985 | Chang et al. | 502/61 |
| 4,654,316 | 3/1987 | Barri et al. | 502/61 |
| 4,803,060 | 2/1989 | Occelli | 423/326 |
| 4,874,730 | 10/1989 | Klazinga | 502/61 |
| 4,891,463 | 1/1990 | Chu | 585/415 |

FOREIGN PATENT DOCUMENTS

| | | |
|---|---|---|
| 82211 | 6/1983 | European Pat. Off. |
| 134849 | 3/1985 | European Pat. Off. |
| 187496 | 7/1986 | European Pat. Off. |
| 62-179593 | 8/1987 | Japan |

*Primary Examiner*—R. Bruce Breneman
*Attorney, Agent, or Firm*—Cushman, Darby & Cushman

[57] ABSTRACT

Zeolites containing gallium in their crystalline framework structure are prepared by treating a zeolite material with a reagent capable of replacing a part of the aluminum of the framework structure of the zeolite material with the gallium. The method is especially applicable for the preparation of faujasitic materials of the formula $$M_{(x+y/n)} [AlO_2]_x [GaO_2]_y [SiO_2]_z$$

wherein:
M is a charge balancing ion and n is the oxidation state thereof,
x, y and z are the respective numbers of tetrahedra represented respectively by AlO$_2$, GaO$_2$ and SiO$_2$,
x+y+z=192, for a said faujasitic structure with no missing tetrahedra,
x+y is from 0.1 to 71 inclusive, and
y is from 0.01 to 60 inclusive.

26 Claims, 5 Drawing Sheets

GALLIUM ZEOLITES

FIELD OF THE INVENTION

This invention relates to crystalline aluminosilicate zeolites containing gallium, their preparation and to catalyst compositions containing them. It relates further to hydrocarbon conversion with such catalysts and in particular to their use in FCC processing.

BACKGROUND OF THE INVENTION

A zeolite may be described generally as a crystalline, three dimensional, stable structure enclosing cavities of molecular dimensions.

Zeolites can be natural or synthetic in origin. Naturally occurring zeolites include gmelinite, chabazite, dachiardite, clinoptilolite, faujasite, heulandite, analcite, levynite, erionite, sodalite, cancrinite, mepheline, lazurite, scolecite, natrolite, offretite, mesolite, mordenite, brewsterite and ferrierite. Synthetic zeolites include the zeolites A,B,E,F,H,J,L,Q,T,W,X,Y,Z,N-A, beta, omega, rho, the EU types, the Fu types, the Nu types, the ZK types, the ZSM types, the ALPO. types, the SAPO types, the pentasil types, the LZ series, and other similar materials.

These crystalline zeolitic materials contain well-defined microporous systems of channels and cages. Because the dimensions of these pores are frequently such as to permit adsorption of molecules up to a certain size, with exclusion of larger molecules, zeolites are sometimes referred to as molecular sieves.

Most zeolites are based on aluminosilicate frameworks, the aluminum and silicon atoms being tetrahedrally coordinated by oxygen atoms.

More particularly, these aoluminosilicates are three dimensional networks of $SiO_4$ and $AlO_4$ tetrahedra which are linked by sharing of oxygen atoms to give an overall atomic ratio $(Si+Al)/O=2$. Each $AlO_4$ unit introduces a single negative charge which must be balanced by an appropriate cation content. When the charge on $AlO_4$ is balanced by hydrogens or by polyvalent cations such as $Ca^{2+}$, $Mg^{2+}$ and particularly by rare earth cations, zeolites possess acidic properties and can function as acid catalysts for various types of hydrocarbon conversion.

In some zeolites, atoms of other elements, such as boron, germanium, chromium, iron, phosphorous and gallium, are present in the framework of the crystalline structure. They may be present either in the original zeolite or be introduced into it.

The terms "zeolite" and "zeolitic structure" used hereinafter include similar materials in which atoms of such other elements are present in the framework. Further, they include materials such as pillared interlayered clays ("PILCS"), which have many of the catalytically valuable characteristics of the aluminosilicate zeolites. We also include all modifications to the above materials, whether obtained by ion-exchange, impregnation, hydrothermal or chemical treatments, as later described.

The acid properties of zeolites have been widely utilised in the production of gasoline by the cracking of oil fractions, particularly of gas oil, using FCC technology.

The initial activation of pure hydrocarbons in general by zeolites is still a matter of discussion and both ionic and radical intermediates and also dehydrogenation processes have been proposed in the initial activation. However, the typical product distributions at higher conversion of hydrocarbons over strongly acid zeolites are consistent with carbocation chemistry involving among other reactions typical 8-scission, alkylation, cyclisation and bimolecular hydrogen-transfer processes. The optimal balance of these processes can lead to optimal amounts and quality of gasoline.

Typically, in FCC technology, wide-pore zeolites having the faujasitic structure (X or Y zeolites) have been employed but improvements have been achieved by including in the catalyst composition other additional zeolites, including medium pore zeolites of the ZSM-5 family, or by adding molecular sieves based on $AlO_4$, $PO_4$ and $SiO_4$ tetrahedra (e.g. SAPO-37). Various modifications of zeolite Y, including ion-exchange, hydrothermal treatment and chemical treatment have provided improved catalysts. Hydrothermal treatments and some chemical treatments result in replacement of some of the framework $AlO_4$ by $SiO_4$ tetrahedra.

A chemical treatment, applicable to a wide range of zeolites, for replacing some of the framework $AlO_4$ by $SiO_4$ tetrahedra is described in EP-A-0082211. In this process a zeolite, especially zeolite Y and preferably in ammonium form, is reacted with an aqueous solution of a fluorosilicate salt, especially ammonium silicon hexafluoride. This results in a range of faujasitic structures known as the LZ series.

Such processes can modify the strength and number of the catalytically active acid sites and are associated with a decrease in the unit cell parameter of the zeolite Y as described in more detail below. The activity and selectivity of FCC catalysts can be correlated to the unit cell parameter of the zeolite; see Pine, LA and et al, J. Catalysis (1984), 85, 466. A cell parameter less than that of a typical Y zeolite has been found to be advantageous.

The incorporation of gallium into various zeolite catalysts is known to change their behaviour.

Thus, U.S. Pat. No. 4,377,504 and U.S. Pat. No. 4,415,440 describe the impregnation of a zeolite catalyst (of unspecified type), contaminated with metals such as vanadium and iron, with gallium. This restores the selectivity of the contaminated catalyst. In such catalysts the gallium is merely present as a component of a catalyst mixture.

EP-A-0147111 teaches impregnation and/or ion exchange for introduction into zeolite catalysts suitable for cracking of ethane rich low hydrocarbon foodstocks.

EP-A-0292030 describes a process for preparing a modified zeolite Y for hydrocracking in which the zeolite is treated with a solution of a gallium salt to effect ion exchange and thereafter calcined to provide a product having a low unit cell size of from 24.21-24.6 Å. Such products give improved catalytic activity in hydroconversion processes.

Ion exchange processes for introducing gallium ions into zeolites are also described in EP-A-0024930 and EP-A-0258726, which latter describes gallium ion exchange of zeolites for providing an FCC catalyst giving an increased aromatic content.

In such ion exchange processes, the gallium is present as gallium ions which may be attached to the zeolite structure.

U.S. Pat. No. 4,803,060 and JP-A-62-179593 describe the primary, i.e. direct, synthesis of zeolites in which the gallium forms part of the crystal framework structure. The zeolites are prepared from solutions capable of reacting so as to provide a crystalline zeolite structure containing gallia and silica alone (U.S. Pat. No. 4,803,060) or gallia, alumina and silica (JP-A-62-179593). The zeolites of U.S. Pat. No. 4,803,060 are used for hydrocracking, while those of JP-A-62-179563 are used for cracking hydrocarbons in general to increase the aromatic content, the cracking ability of the zeolites being tested with reference mainly to n-hexane.

U.S. Pat. No. 4,524,140 and U.S. Pat. No. 4,620,921 describe the secondary synthesis of zeolites in which boron or iron present in the crystal framework structure of a zeolite is replaced by gallium. This substitution is achieved by a hydrothermal activation technique using liquid water at high temperature and pressure in the presence of gallium chloride. The product had an improved c-value for cracking n-hexane.

EP-A-0134849 describes the reaction of high silica zeolites with various volatile metallic compounds having a radius ratio below 0.6, including chloride vapour. The zeolite is calcined before reaction with the volatile compound to create vacancies in the lattice into which the metal may be introduced. No structural data are given to substantiate the presence of the metal in the framework structure.

EP-A-0187496 describes the synthesis of zeolites containing gallium in which a high silica zeolite ($SiO_2/Al_2O_3=26,000$) is treated with an aqueous solution containing gallium at a pH of at least 7. Again, no structural data are given, so there is no confirmation that the gallium enters the framework structure.

Likewise U.S. Pat. No. 4,891,463 describes the synthesis of ZSM 5 zeolites containing gallium in which high silica ZSM 5 zeolites are treated with an aqueous alkali solution containing gallium. It is claimed that at least some of the gallium is present in the framework structure, though no mention is made as to whether the gallium replaces silicon or aluminium.

Each of the above processes provides a zeolite catalyst in which gallium is present in some form or other, i.e. either as gallia in admixture with the zeolite, as gallium ions or as gallium within the crystal framework structure.

However, we find that in all of the above structures either the gallium is not present in a form in which it has maximum effect, especially in FCC technology, or it is necessary to use very large amounts of gallium in the system to achieve the improved effect.

In particular, when incorporating gallium into a faujastic structure by direct synthesis a particularly large amount of gallium is present in the starting reaction medium and yet only a small amount is finally incorporated into the crystal framework structure.

SUMMARY OF THE INVENTION

Surprisingly, we find that excellent catalytic activity with improved selectivity, particularly improved aromatic content can be achieved, especially in FCC technology, using only a small amount of gallium if a zeolite, especially a faujasitic zeolite, is prepared by secondary synthesis.

Although only a small amount of gallium is used as starting material, the synthesis allows larger amounts of gallium to be incorporated into the crystalline structure than had previously been achieved.

The present invention provides zeolites modified by the partial replacement of aluminium in the crystal framework structure by gallium and containing larger amounts of gallium in the framework structure than had previously been achieved.

This isomorphic substitution may be achieved by a secondary synthesis in which the zeolite is reacted with a reagent capable of removing aluminium from the crystal framework structure and providing gallium ions for replacing the aluminium.

Reagents which may be used for such partial replacement of aluminium by gallium contain gallium and halogen.

In one method of synthesis which may be used the zeolite is reacted with a gallium halide such as gallium trifluoride in the vapour phase.

However, the reagent with which the zeolite is reacted is preferably a fluorogallate salt, more preferably a fluorogallate salt having at least a degree of solubility in water, the reaction preferably taking place in an aqueous medium. More preferably, the reaction is carried out at a pH which at least at the start of the reaction is a roughly neutral pH of 5–8, especially 5–6.7, more especially 6–6.5, and at a temperature of 50°–95° C., especially 70°–80° C.

It may be possible to carry out the secondary synthesis reaction of the invention on any zeolite such as those listed above.

However, the process is especially suitable for the modification, by isomorphic substitution, of wide and medium-pore zeolites which, after modification provide catalysts especially suitable for FCC.

Typical wide-pore zeolites (having a pore size $>7$ Å, usually 7–8 Å, but possibly 10–12 Å) include zeolites X and Y, especially the LZY, such as LZY-210, and USY series, zeolite H-Y, certain ZSMs, especially ZSM-20, EM1, EM2, zeolite 8 and mordenite (MOR), and typical medium-pore zeolites (having a pore size of about 5–6 Å) including certain ZSMs, especially ZSM 5, ZSM 11 and the zeolite theta-1 (sometimes called zeolite-TON).

Particularly preferred zeolite catalysts for FCC are wide pore zeolites having a faujasitic structure of cubic form, e.g. zeolite X (having a Si/Al ratio of $<1.7$) or zeolite Y (having a Si/Al ratio $>1.7$) or of, for example, ZSM-20; which is reported to be a mixture of both hexagonal and cubic forms of faujasite.

Subsequent to the isomorphic substitution of the gallium the resultant zeolite may be subjected to the usual further modification steps such as washing, drying, combining with a mixture of components, usually including a matrix for the zeolite material, and calcining (either dry or in the presence of steam) to provide a catalyst composition, especially an FCC catalyst composition.

It is especially preferred that the zeolite starting material contains replacement ions rendering the zeolite more suitable for the secondary synthesis reaction. Suitably the replacement ions are provided by a preliminary ion exchange reaction, and an especially preferred replacement ion is ammonium.

The preferred reagent for the secondary synthesis reaction is capable of providing $GaF_x^{(3-x)}$-ions in aqueous solution, wherein x is 0.5–6, preferably greater than 2, especially 4 or 5.

The cation of the reagent may be metallic or non-metallic, but is preferably a cation capable of providing an aluminium containing reaction product which is soluble in water. An especially preferred cation is ammonium.

When the starting zeolite material for the secondary synthesis reaction has a faujasitic structure, the anhydrous zeolite material so synthesised has a framework unit cell composition characterised by the formula $$M_{(x+y)/n} [AlO_2]_x [GaO_2]_y [SiO_2]_z \quad (I)$$

wherein

M is a charge balancing ion and n is the oxidation state thereof.

x, y and z are the respective numbers of tetrahedra represented respectively by $AlO_4$, $GaO_2$ and $SiO_2$, $x+y+z=192$ for a faujasitic structure with no missing tetrahedra, $x+y$ is from 0.1 to 71 inclusive, preferably from 10 to 56 inclusive, and y is from 0.01 to 60 inclusive, preferably from 0.1 to 15 inclusive.

The corresponding aluminosilicate starting material has the formula $$M_{x/n} [AlO_2]_x [SiO_2]_y$$

wherein

M, n, x and y are as defined above, $x+y=192$ for a faujasitic structure with no missing tetrahedra, and $x/(x+y)$ is from 0.01 to 0.5.

A zeolite Y in particular is a cubic structure for which a unit cell parameter is measurable. The unit cell size of a particular zeolite Y gives an indication of the degree of substitution of the aluminium by another element.

For example, silicon is smaller than aluminium, so replacement of aluminium by silicon will cause a decrease in the unit cell size. As mentioned above such a decrease in unit cell size was considered previously to provide improved selectively.

On the other hand, gallium is larger than aluminium, so replacement of aluminium by gallium will cause an increase in the unit cell size. Furthermore, the more gallium substituted into the crystal framework structure, the greater is the unit cell size. Since an increase in cell size obtained by incorporation of additional aluminium leads to reduced activity in these aluminium-rich faujasites, it is surprising that an increase in cell size achieved by increased gallium substitution provides improved catalytic activity.

The unit cell size of $NH_4Y$, an ammonium ion exchanged zeolite Y, is 24.68 Å, as compared with a unit cell size of 24.70 Å for a GaY prepared by direct synthesis (as described for example in JP-A-62-179593 and U.S. Pat. No. 4,803,060), and at least 24.72 and possibly 24.79 Å or higher (and even possibly 24.8 Å or higher) for a GaY prepared by secondary synthesis in accordance with the method of the invention.

Indeed, the method can be so controlled as to provide an increased unit cell size within the range 24.76-24.79 Å.

Similarly, for a modified zeolite Y of related structure, containing gallium and having a molar ratio of silica/(alumina+gallia) of at least 5/1, the unit cell size is from 0.01 to 0.15 Å inclusive greater than that of the corresponding gallium free zeolite, i.e. the gallium free zeolite having a silica/alumina molar ratio which is the same as the silica/(alumina+gallia) molar ratio of the gallium containing zeolite Y.

Examples of the increase in unit cell size achievable are as follows

| Zeolite | Unit cell size of Ga free zeolite (Å) | Unit cell size of Ga zeolite (Å) |
|---------|---------------------------------------|----------------------------------|
| CSY     | 24.50                                 | 24.53                            |
| USY     | 24.31                                 | 24.36                            |
| ZSM20   | 24.52                                 | 24.72                            |

The method allows a predetermined, very small, amount of gallium to be provided in discrete locations in the zeolite at positions exactly where it is required to provide a catalyst the effect of which is maximised during FCC, namely at a position within the crystal framework structure. Although not wishing to be bound by theory, it is believed that, in use, the gallium will be dislodged from the framework structure (as is aluminium) and so provide a fine dispersion of the gallium having excellent catalytic properties. This leads to particularly efficient gallium usage.

Moreover, the zeolite has two different distinct types of acid site provided respectively by the framework aluminium and the framework gallium, rendering the zeolite useful for example, for different respective catalytic reactions, in particular, the gallium, especially gallium dislodged during use, can promote dehydrogenation reactions.

In a typical method embodying the invention a zeolite such as a zeolite X, Y, MOR, β, ZSM-20, ZSM-5 or zeolite TON is subjected to ion exchange to provide the corresponding $NH_4$ zeolite.

A slurry of the zeolite in an aqueous medium buffered at pH 6 with ammonium acetate is then formed and a solution of an ammonium gallofluoride, e.g. $(NH_4)_3GaF_6$, is added over a suitable period of time, typically 4 hours, to the stirred slurry at 70° C. This allows the reaction of zeolite and gallofluoride salt to take place.

The amount of ammonium acetate per gram of anhydrous $NH_4$ zeolite in the slurry is preferably in the region of from 0.8–1 g, especially 0.85–0.95 g, and the ammonium acetate is preferably added in the form of an aqueous solution at a concentration of 1–1.1M. Typically $NH_4$ zeolite is added in the form of a hydrate containing from 10–18% $H_2O$, and the desired concentration of ammonium acetate by weight of the anhydrous $NH_4$ zeolite can be achieved by adding about 10 ml of a 1.02M ammonium acetate solution per 1 g $NH_4$ zeolite hydrate.

The amount of ammonium gallofluoride solution providing the desired gallium fluoride ion: $NH_4$ zeolite weight ratio is preferably around $8 \times 10^{-4}$ to $2.2 \times 10^{-3}$ moles of ammonium gallofluoride per 1 g hydrated $NH_4$ zeolite and the concentration of added ammonium gallofluoride solution is preferably around $1.7 \times 10^{-3}$ molar.

Although the above amounts of ammonium acetate and ammonium gallofluoride by weight of zeolite are frequently effective, these values can be modified for optional reaction in any given instance.

The reaction product may be washed free of excess fluoride and then dried.

Where the resultant products have the required structure, catalysts, especially FCC catalysts, can be prepared from those products by conventional procedures such as combining with a matrix and calcining. Such catalysts are found to be much more active than corresponding FCC catalysts prepared from parent Y-zeolites in the conversion of hydrocarbons such as n-hexane in the temperature range 200°-600° C. Moreover, hydrocarbon product distributions are also modified. At lower conversions more olefins and alkane isomers are observed and at higher conversions such products contain more aromatics. Isomers and aromatics can be desirable components in gasoline because they increase the motor octane number (MON). Catalysts of this type are also useful in similar processes such as hydrocracking, isomerisation, polymerisation and cyclisation.

In particular, the invention provides a process for preparing a gasoline from a hydrocarbon feed which process comprises subjecting the hydrocarbon feed to catalytic cracking under FCC conditions, using a catalyst comprising a zeolite material of the formula (I) as hereinbefore defined.

The invention also provides such a process in which the catalyst comprises zeolite Y having a unit cell size of at least 24.72 Å, or a modified zeolite having a molar ratio of silica/(alumina+gallia) of at least 5/1 in which the unit cell size is from 0.01 to 0.15 Å greater than that of the corresponding gallium free zeolite.

The catalyst may comprise from 0.1 to 60 wt % of the Ga zeolite material and a matrix binder therefor, which matrix binder may constitute the remainder of the catalyst.

Typically, the binder matrix may be for example, a silica sol, an alumina sol and/or clay.

DESCRIPTION OF PREFERRED EMBODIMENTS

The invention will now be described in more detail with reference to the following Examples, Tables and accompanying drawings in which Examples 1 and 2 illustrate respective large and small laboratory scale procedures embodying the invention for secondary synthesis of zeolite GaY from zeolite NH$_4$Y, Examples 3 and 4 are respective comparative examples illustrating the introduction of gallium into zeolite Y by impregnation and ion exchange respectively, Example 5 is a comparative example illustrating the direct synthesis of zeolite GaY, Example 6 illustrates the preparation of a starting material, ZSM-20, for the secondary synthesis of a Ga ZSM-20 embodying the invention, Example 7 illustrates a procedure embodying the invention for the secondary synthesis of a Ga ZSM-20 from the product of Example 6, Example 8 illustrates a procedure embodying the invention for cracking n-hexane using the Ga-Y of Examples 1 and 2, Example 9 illustrates a procedure embodying the invention for cracking of a gas oil using the Ga-Y of Example 1 and, for comparison, a commercially available zeolite Y, Tables A-E give the X-ray diffraction patterns of the starting material, zeolite NH$_4$Y, of Example 1 (Table A) and the reaction products of respective Examples 1,2,6 and 7 (Tables B-E), Table 1 gives a summary of the unit cell size and % crystallinity values of the starting material of Example 1 and the reaction products of Examples 1-7, Table 2 gives a summary of the molecular structures of the starting material of Example 1 and the reaction products of Examples 1,2,6 and 7, Table 3 gives the results for n-hexane cracking for Example 8, and Table 4 gives the results from gas oil cracking from Example 9,

EXAMPLE 1 BEST METHOD

Figure 1:
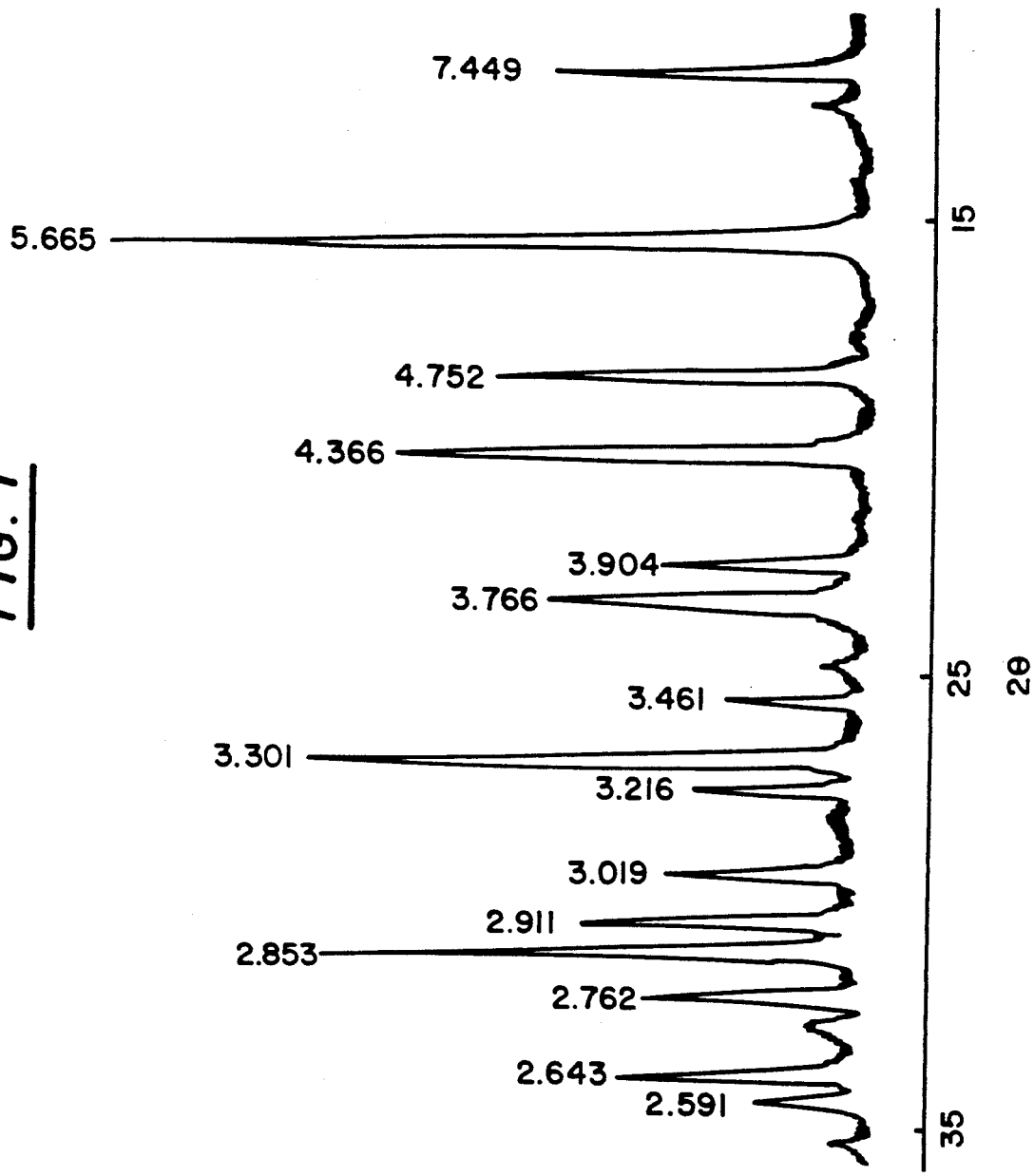
FIGS. 1-5 are respective graphs illustrating the X-ray diffraction patterns of the starting material, zeolite NH$_4$Y, of Example 1 (FIG. 1) and the reaction products of respective Examples 1,2,6 and 7 (FIGS. 2-5).
Figure 2:
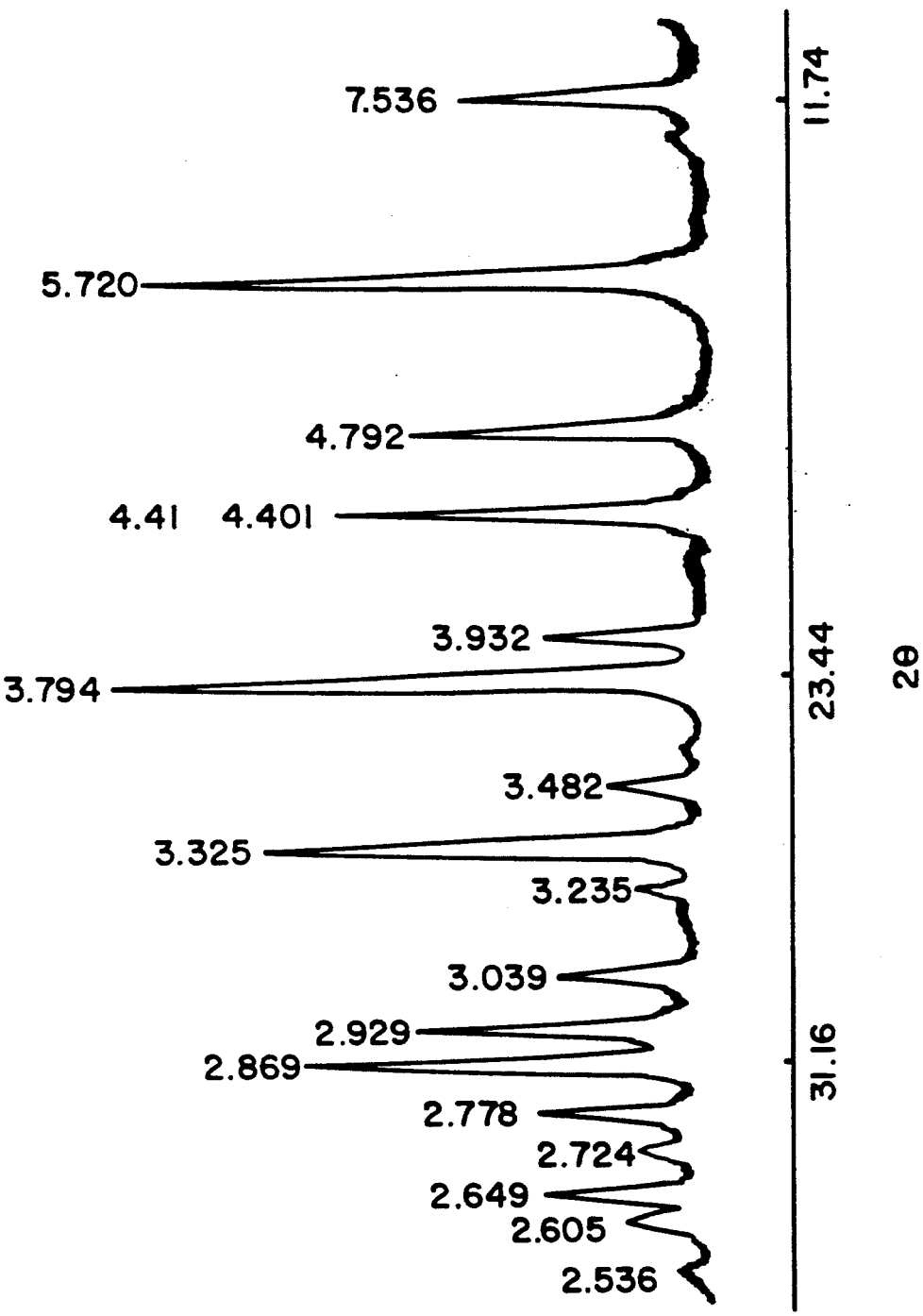
Figure 3:
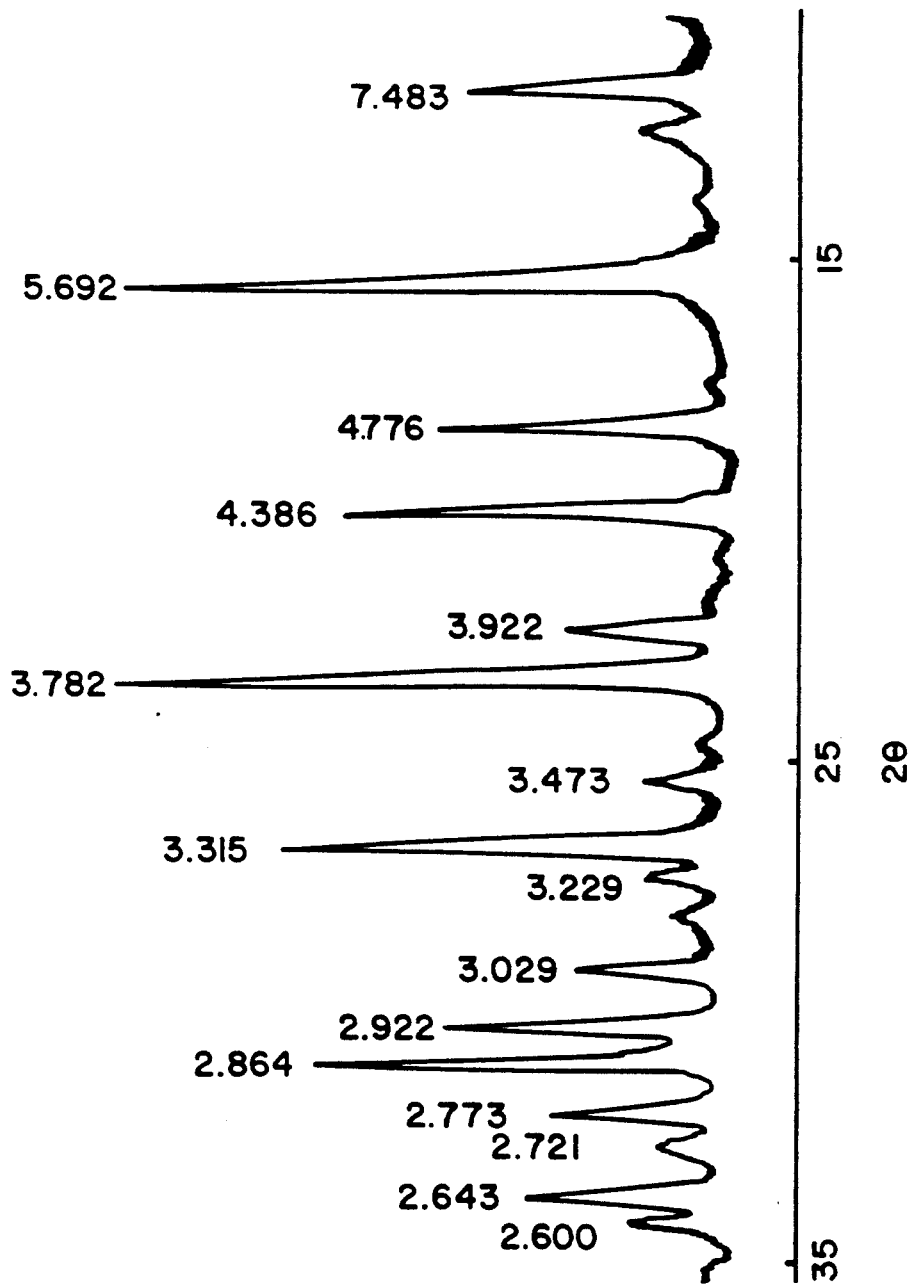
Figure 4:
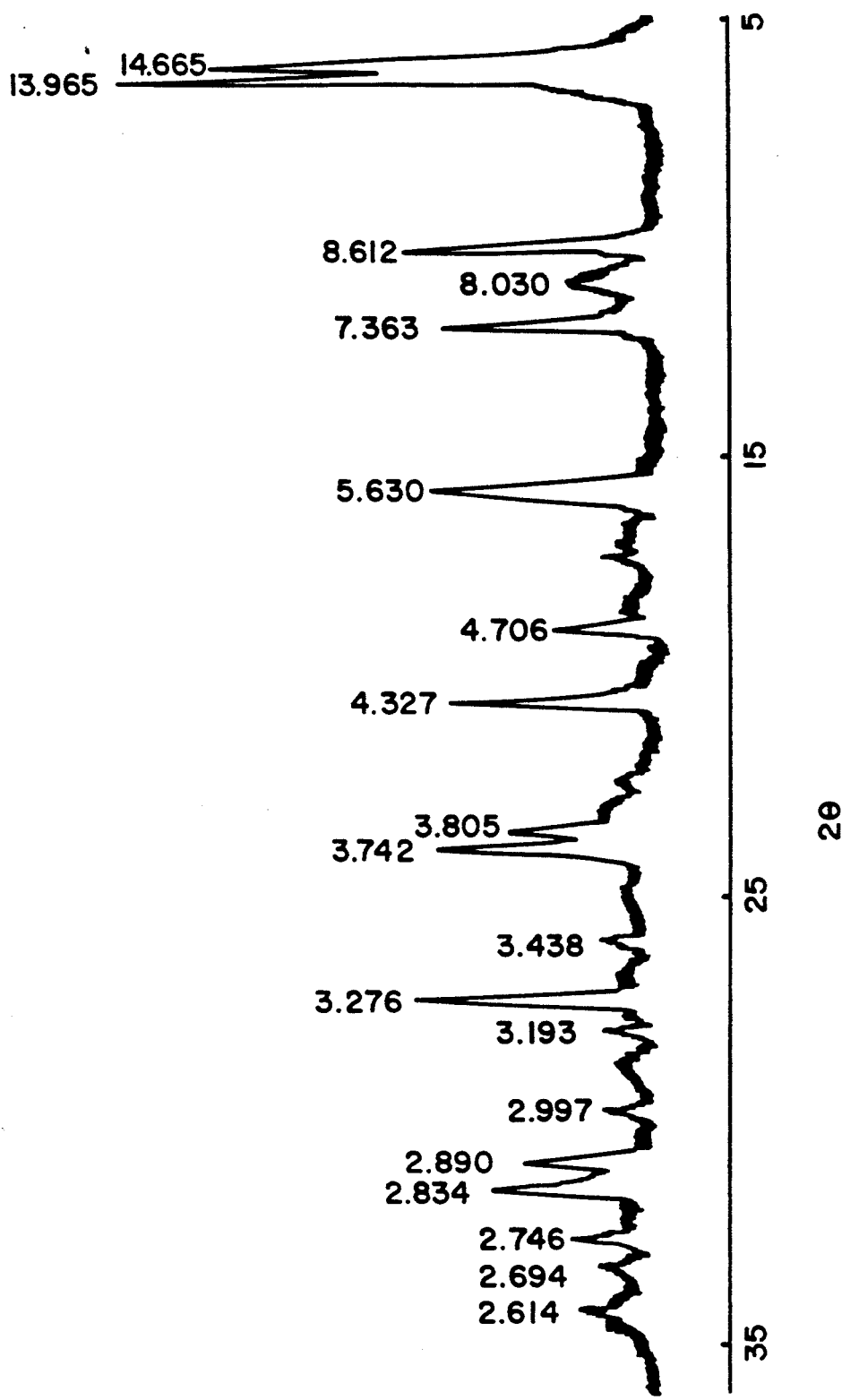
Figure 5:
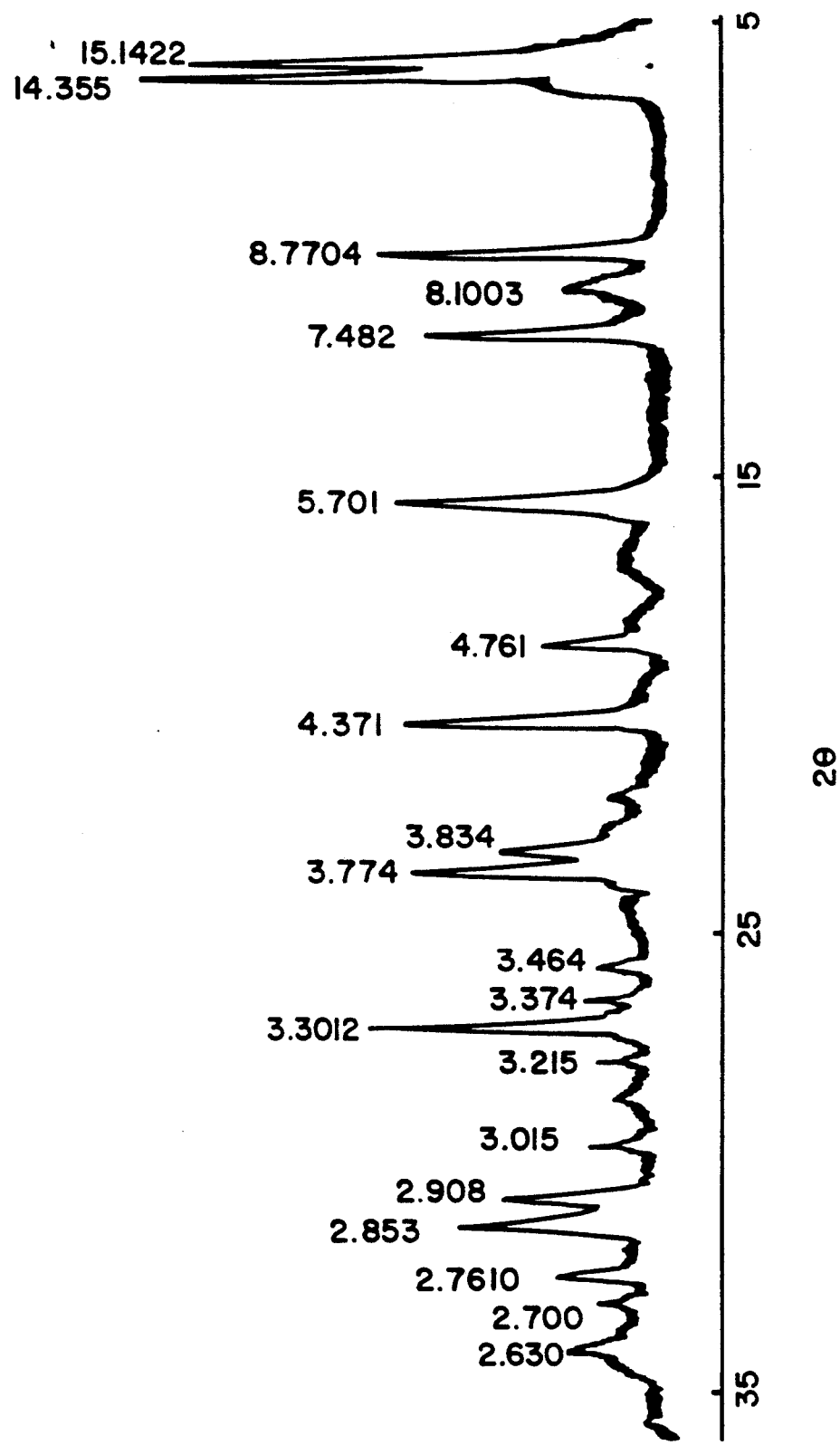

Secondary Synthesis of Zeolite GaY from Zeolite NH$_4$Y

The synthesis of zeolite Y containing gallium from zeolite NH$_4$Y and fluorogallate was carried out by continuous addition of fluorogallate solution to a slurry of the zeolite NH$_4$Y in ammonium acetate in a stirred reactor under controlled conditions.

| Reactants and conditions | |
|---|---|
| Zeolite NH$_4$Y: | 100 g (Al = 12.79 wt % Si = 32.25 wt %) |
| Reaction temperature: | 72-75° C. |
| Reaction time: | 4 hrs |
| Reaction volume (slurry): | 1000 cm$^3$ (A + B) |
| A = | 700 cm$^3$ deionised water |
| B = | 300 cm$^3$ ammonium acetate (3.4 M) |
| pH = | 6.5 |
| Fluorogallate solution: | C + D = 1000 cm$^3$ |
| C: | gallium nitrate: 21.097 g/500 cm$^3$ |
| D: | ammonium fluoride: 15.27 g/500 cm |

Removal of Fluorine from As-made Zeolite

The as made zeolite (Al-GaY) was washed twice with 1.5M ammonium sulphate in a 1:10 weight:volume ratio (zeolite:ammonium sulphate solution) for 90 minutes at 80° C.

The X-ray diffraction patterns of the NH$_4$Y starting material and GaY product are given in tabular form in Tables A and B respectively and in graphical form in FIGS. A and B respectively, and their various characteristics are summarised in Tables 1 and 2.

TABLE A

XRD PATTERN OF NH$_4$Y (Crosfield Chemical) [Unit Cell 24.700 Å]

| 2θ | d/Å | I/Io |
|---|---|---|
| 11.880 | 7.449 | 43 |
| 15.635 | 5.667 | 100 |
| 18.670 | 4.752 | 52 |
| 20.336 | 4.366 | 64 |
| 22.772 | 3.904 | 27 |
| 23.618 | 3.766 | 98 |
| 24.966 | 3.566 | 10 |
| 25.740 | 3.461 | 19 |
| 27.010 | 3.301 | 73 |
| 27.731 | 3.216 | 22 |
| 29.587 | 3.019 | 28 |
| 30.705 | 2.911 | 38 |
| 31.343 | 2.853 | 67 |
| 32.405 | 2.762 | 31 |
| 33.040 | 2.711 | 11 |
| 34.031 | 2.634 | 34 |
| 34.610 | 2.591 | 15 |

TABLE B

| EXAMPLE NO 1 Ga-Y [Unit Cell 24.77 Å] | | |
|---|---|---|
| 2θ | d/Å | I/Io |
| 11.741 | 7.536 | 43 |
| 15.489 | 5.720 | 95 |
| 18.514 | 4.793 | 51 |
| 20.176 | 4.401 | 67 |
| 22.609 | 3.933 | 30 |
| 23.445 | 3.794 | 100 |
| 24.799 | 3.590 | 10 |
| 25.576 | 3.483 | 22 |
| 26.830 | 3.322 | 76 |
| 27.564 | 3.235 | 17 |
| 29.389 | 3.039 | 26 |
| 30.511 | 2.929 | 44 |
| 31.164 | 2.869 | 69 |
| 32.215 | 2.778 | 33 |
| 32.874 | 2.724 | 15 |
| 32.834 | 2.649 | 31 |
| 34.424 | 2.605 | 19 |

EXAMPLE 2

Secondary Synthesis of Zeolite GaY from Zeolite $NH_4Y$

Method as Example No. 1 with the following modification.

| Reactant and conditions | |
|---|---|
| Zeolite $NH_4Y$ = | 2 gm (Al = 12.79 wt %, Si = 32.25 wt %) |
| Reaction temperature = | 72–75° C. |
| Reaction time = | 4 hrs |
| Reaction volume = | 20 cm³ (A + B) |
| A = | 14 cm³ deionised water |
| B = | 6 cm³ ammonium acetate (3.4 M) |
| pH = | 6–6.5 |
| Fluorogallate solution = | C + D = 30 cm³ |
| C = | $Ga(NO_3)_3$: 0.8439 gm/15 cm³ |
| D = | $NH_4F$: 0.732 gm/15 cm³ |

Removal of Fluorine from As-made Zeolite

The as-made zeolite (Al-GaY) was washed twice by 1.5M ammonium sulphate in a 1:10 weight:volume ratio (zeolite: ammonium sulphate solution) for 90 minutes at 80° C.

The X-ray diffraction pattern of the GaY product is given in tabular form in Table C and in graphical form in FIG. C and their various characteristics are summarised in Tables 1 and 2.

TABLE C

| XRD PATTERNS EXAMPLE NO 2 Ga-Y [Unit Cell 24.795 Å] | | |
|---|---|---|
| 2θ | d/Å | I/Io |
| 11.826 | 7.483 | 55 |
| 12.632 | 7.007 | 27 |
| 15.565 | 5.692 | 98 |
| 18.577 | 4.776 | 51 |
| 20.243 | 4.387 | 21 |
| 22.670 | 3.922 | 29 |
| 23.517 | 3.782 | 100 |
| 25.648 | 3.473 | 17 |
| 26.890 | 3.320 | 69 |
| 27.624 | 3.230 | 17 |
| 29.481 | 3.029 | 27 |
| 30.585 | 2.922 | 44 |
| 31.228 | 2.864 | 67 |
| 32.281 | 2.773 | 32 |
| 32.906 | 2.721 | 14 |
| 33.910 | 2.643 | 34 |

TABLE C-continued

| XRD PATTERNS EXAMPLE NO 2 Ga-Y [Unit Cell 24.795 Å] | | |
|---|---|---|
| 2θ | d/Å | I/Io |
| 34.488 | 2.600 | 17 |

EXAMPLE 3 COMPARATIVE

Impregnation of Zeolite $NH_4Y$ with Gallium

Zeolite $NH_4Y$ (5 g) was mixed with gallium nitrate solution [$Ga(NO_3)_3 \cdot 9H_2O$:0.55 g] and the slurry was heated to incipient dryness. The modified zeolite was then dried in an oven at 110° C. The unit cell size and %. crystallinity values of the resultant gallium impregnated product are given in Table 1.

EXAMPLE 4 COMPARATIVE

Ion Exchange of Zeolite $NH_4Y$ with Gallium

Zeolite $NH_4Y$ (5 g) was stirred under reflux conditions in 100 cc of 0.33M gallium nitrate [$Ga(NO_3)_3 \cdot 9H_2O$] solution for 36 hours at 80° C. The product was then filtered, washed with distilled water and dried at 110° C. in an oven. The unit cell size and % crystallinity values of the resultant gallium ion-containing product are given in Table 1.

EXAMPLE 5 COMPARATIVE

Direct Synthesis of GaY

Direct synthesis of zeolite Y containing gallium involved a two-step synthesis procedure. A primary siliceous gel (Si/(Al+Ga)≈8) was allowed to age at room temperature for 24 hours. The primary siliceous gel was subsequently made up into a secondary more aluminous reaction gel which was allowed to crystallise at 95° C.

Primary Gel

Solution A: sodium aluminate (of composition 20 wt % $Na_2O$, 20 wt % $Al_2O_3$) was prepared by adding 12.18 g of $Al(OH)_3$ to a solution of NaOH (NaOH—10.26 g, $H_2O$—17.34 g).

Solution B: a solution of NaOH (20.64 g) was prepared in 86.1 cc of distilled water.

The primary gel was prepared by adding 13.26 g of solution A into solution B and then adding 5 g of gallium nitrate [$Ga(NO_3)_3 \cdot 9H_2O$] followed by 82.87 g of sodium silicate (composition 29 wt % $SiO_2$, 8.6 wt % $Na_2O$). The primary solution was aged for 24 hours at room temperature.

Secondary Gel

The primary solution was then mixed with 263 g of sodium silicate (29 wt % $Si_2O$, 86 wt % $Na_2O$), 59.4 g of water, 47.1 g of solution A and 5 g of gallium nitrate. The whole mixture was stirred vigorously and then 72.06 g of aluminium sulphate solution (6.89 wt % $Al_2O_3$, 19.83 wt % $S_2SO_4$) was added dropwise with continuous stirring. The resulting secondary gel was allowed to crystallise at 95° C. under static conditions for 24 hours. The product was filtered, washed and dried at 110° C. in an oven.

The oxide mole ratio of the secondary gel was as follows:

$SiO_2/Al_2O_3 = 8.50$   $Na_2O/Al_2O_3 = 4.43$

-continued

SiO$_2$/Ga$_2$O$_3$=77.22  Na$_2$O/SiO$_2$=0.521
SiO$_2$/(Al$_2$O$_3$ + Ga$_2$O$_3$)=7.658  Na$_2$O/(Al$_2$O$_3$ + Ga$_2$O$_3$)=3.99

The unit cell size and % crystallinity values of the resultant zeolite GaY are given in Table 1.

EXAMPLE 6

Preparation of ZSM 20 (Starting Material for Secondary Synthesis of Ga ZSM-20)

Sodium aluminate was prepared by adding sodium hydroxide solution (NaOH 11.50 g, H$_2$O 5 g) into Kaiser alumina 16.38 g (Al$_2$O$_3$·3H$_2$O). The slurry was heated under reflux until an opaque solution formed. A small portion (3.4 g) of the hot solution was transferred quickly into a polypropylene bottle containing 80.5 cc of 4.53N tetraethyl ammonium hydroxide (TEAOH) solution (Alfa product). Stirring during the addition was continuous. The mixture was then transferred into 38.9 g of tetramethylorthosilicate (Me SiO$_4$). The bottle was capped and the mixture was shaken vigorously for 3-4 hrs. After about 20 minutes, the gel became hot and was then cooled in ice until no more heat was produced. The slurry was left to age for one day at room temperature. Crystallization of the gel was effected in two stages. First, the bottle was placed in a steam chest/bath at 95° C. for 24 hours and then the bottle was transferred into a water bath at 100° C. under reflux conditions for 21 days. After complete crystallization the product was separated from the mother liquor and washed with distilled water and dried overnight at 110° C.

| Gel mole Ratio | | | | |
|---|---|---|---|---|
| SiO$_2$/Al$_2$O$_3$ | 23.3 | OH/SiO$_2$ | : | 0.97 |
| TEA/SiO$_2$ | 0.85 | Na$^+$/SiO$_2$ | : | 0.12 |
| H$_2$O/SiO$_2$ | 17.8 | H$_2$O/OH | = | 18.3 |
| | | $\frac{NA^+ + TEA}{Na+}$ | | 8.28 |

The X-ray diffraction pattern of the resultant ZSM020 is given in tabular form in Table D and in graphical form in FIG. D. Various characteristics of the product are summarised in Tables 1 and 2.

TABLE D

EXAMPLE NO 6
XRD PATTERN OF ZSM20 (PARENT)
[Unit Cell 24.515 Å]
(Indexed in cubic symmetry)

| 2θ | d/Å | I/Io |
|---|---|---|
| 6.026 | 14.665 | 83 |
| 6.329 | 13.965 | 100 |
| 6.617 | 13.357 | 22 |
| 10.271 | 8.612 | 46 |
| 11.017 | 8.030 | 20 |
| 12.018 | 7.363 | 44 |
| 15.739 | 5.630 | 48 |
| 17.261 | 5.137 | 12 |
| 18.856 | 4.706 | 23 |
| 20.523 | 4.327 | 42 |
| 22.956 | 3.874 | 16 |
| 23.377 | 3.805 | 31 |
| 23.772 | 3.742 | 42 |
| 25.915 | 3.438 | 14 |
| 27.220 | 3.276 | 47 |
| 27.938 | 3.193 | 11 |
| 29.807 | 2.997 | 12 |
| 30.940 | 2.890 | 26 |
| 31.563 | 2.834 | 33 |

TABLE D-continued

EXAMPLE NO 6
XRD PATTERN OF ZSM20 (PARENT)
[Unit Cell 24.515 Å]
(Indexed in cubic symmetry)

| 2θ | d/Å | I/Io |
|---|---|---|
| 32.625 | 2.744 | 17 |
| 33.247 | 2.694 | 12 |
| 34.298 | 2.614 | 14 |

EXAMPLE 7

| Reaction Conditions: |
|---|
| Reaction temperature = 75° C. |
| Reaction time = 3 hrs |
| pH = 6-6.5 |

ZSM-20 (calcined at 500° C.) was washed twice with 1.5M ammonium sulphate using a solid/solution weight ratio of 1:10 at 80° C. A sample (2 gm) of the washed ZSM-20 was mixed with 25 cm$^3$ of ammonium acetate solution (30%). The resultant slurry was heated to 75° C. before the addition of reagent. The reagent mixture (50 cm$^3$ containing 1.65×10$^{-3}$ moles ammonium fluorogallate) was pumped into the hot slurry of the zeolite at the rate of 0.55 cm$^3$/min for three hours. After complete addition of reagent, the reaction mixture including mother liquor was stirred under reflux for one hour and the resultant product was separated from the mother liquor whilst hot. The as-made zeolite, Ga ZSM 20, was washed twice with 1.5M ammonium sulphate (weight ratio of Ga ZSM 20: ammonium sulphate—1:10) at 80° C. for 2½ hours.

The X-ray diffraction pattern of the resultant Ga ZSM 20 is given in tabular form in Table E and in graphical form in FIG. E. Various characteristics of the product are summarised in Tables 1 and 2.

TABLE E

EXAMPLE NO 7
ZSM20-Ga [Unit Cell 24.729 Å]
(Indexed in cubic symmetry)

| 2θ | d/Å | I/Io |
|---|---|---|
| 5.836 | 15.142 | 87 |
| 6.157 | 14.355 | 100 |
| 6.481 | 13.638 | 26 |
| 10.085 | 8.770 | 52 |
| 10.922 | 8.100 | 22 |
| 11.827 | 7.482 | 41 |
| 15.541 | 5.701 | 51 |
| 18.635 | 4.761 | 27 |
| 20.315 | 4.371 | 49 |
| 23.197 | 3.834 | 34 |
| 23.568 | 3.775 | 48 |
| 25.714 | 3.464 | 17 |
| 26.415 | 3.374 | 13 |
| 27.008 | 3.301 | 53 |
| 27.747 | 3.215 | 12 |
| 29.628 | 3.015 | 14 |
| 30.742 | 2.908 | 33 |
| 31.353 | 2.853 | 40 |
| 32.426 | 2.761 | 22 |
| 33.076 | 2.708 | 13 |
| 34.192 | 2.631 | 31 |

TABLE 1

| Example | UCS | % crystallinity |
|---|---|---|
| NH$_4$Y | 24.70 | 114 |
| 1 | 24.77 | 109 |

TABLE 1-continued

| Example | UCS | % crystallinity |
|---|---|---|
| 2 | 24.79 | 114 |
| 3 | 24.70 | 94 |
| 4 | 24.68 | 90 |
| 5 | 24.68 | 75 |
| 6 | 24.52 | 129 |
| 7 | 24.72 | 110 |

TABLE 2

| Example | (Microanalysis) Si/Al | Si/Al + Ga | Si/Al (NMR) | Unit Cell Composition (NMR)* |
|---|---|---|---|---|
| NH$_4$Y | 2.43 | 2.43 | 2.50 | $(Al_2)_{55}(SiO_2)_{137}$ |
| 1 | 2.945 | 2.496 | 2.66 | $(AlO_2)_{52}(GaO_2)_3(SiO)_{137}$ |
| 2 | 3.586 | 3.075 | 2.74 | $(AlO_2)_{51}(GaO_2)_4(SiO)_{137}$ |
| 6 | 3.99 | 3.99 | 3.53 | $(AlO_2)_{42}(SiO_2)_{150}$ |
| 7 | 4.91 | 3.60 | 4.38 | $(AlO_2)_{36}(GaO_2)_6(SiO_2)_{150}$ |

*Assuming 192 tetrahedral atoms per unit cell, and substitution of Al by Ga and the rest of Ga or Al is non-framework.

As can be seen from Table 1, the GaY prepared by the secondary synthesis procedure embodying the invention has a much greater unit cell size (24.77–24.79 Å) than the gallium containing zeolites prepared by impregnation (24.70 Å), ion exchange (24.68 Å) and direct synthesis (24.68 Å). This illustrates the increased amount of gallium present in the crystal framework structure.

Moreover, this increased amount of gallium can be included while keeping the tetrahedral structure of the zeolite essentially intact, i.e., without substantial degradation.

EXAMPLE 8

Zeolite materials, as indicated in Table 3 below (about 0.1 g) were pelleted and ground to 40–60 UK mesh size and activated in a stainless steel micro reactor at 450° C. for 16 hours under a stream of dry nitrogen. Prolonged pulses of n-hexane were fed to the reactor and products were sampled and analysed by gas chromatography.

TABLE 3

Effect of gallium oxide on rate of n-hexane conversion at 400° C.

| Zeolite Material* | Gallium Oxide content (wt %) | Rate of C$_6$ conversion relative to that of NH$_4$Y |
|---|---|---|
| NH$_4$Y | 0 | 1 |
| Ex 1 | 3.62 | 4.75 |
| Ex 2 | 5.95 | 7.2 |

*See Table 1

This example shows the surprisingly increased activity achieved by gallium substitution.

EXAMPLE 9

Micro spheroidal catalytic cracking catalysts were prepared by spray drying slurries containing 25 wt % silica sol, 50 wt % clay and 25 wt % of either a commercial HY zeolite (at 24.52 Å unit cell size) or the gallium zeolite from Example 1. Both catalysts were washed and ion exchanged with ammonium sulphate and then steam deactivated at 760° C. for 5 hours in 100% steam prior to catalytic evaluation using a micro-activity test apparatus. Test conditions were 516° C., 13.7 hr$^{-1}$ WHSV and a catalyst to oil ratio of 3.5 with a Kuwait waxy distillate gas oil feed.

Degree of conversion and product selectivities are compared in Table 4.

TABLE 4

Gas Oil Cracking

| | HY | GaY |
|---|---|---|
| Wt % conversion | 64.4 | 65.6 |
| Wt % Coke | 1.66 | 2.37 |
| Wt % Gasoline | 45.6 | 46.7 |
| Wt % LPG | 15.4 | 14.8 |
| Wt % Dry Gas | 1.75 | 1.71 |
| Wt % Hydrogen | 0.07 | 0.19 |
| Wt % n-Butane | 0.72 | 0.58 |
| Wt % ISO-Butane | 2.81 | 3.20 |
| WT % ISO-Butene | 1.68 | 1.68 |
| I/N Butane ratio | 3.9 | 5.6 |

TABLE 4

Gas Oil Cracking

| | HY | GaY |
|---|---|---|
| Wt % conversion | 64.4 | 65.6 |
| Wt % Coke | 1.66 | 2.37 |
| Wt % Gasoline | 45.6 | 46.7 |
| Wt % LPG | 15.4 | 14.8 |
| Wt % Dry Gas | 1.75 | 1.71 |
| Wt % Hydrogen | 0.07 | 0.19 |
| Wt % n-Butane | 0.72 | 0.58 |
| Wt % ISO-Butane | 2.81 | 3.20 |
| WT % ISO-Butene | 1.68 | 1.68 |
| I/N Butane ratio | 3.9 | 5.6 |

This example shows that surprisingly increased amounts of isomerized products evident from the higher iso/n-butane ratio.

We claim:

1. A method of preparing a zeolite material having a crystalline framework structure containing silicon, aluminum and gallium, which method comprises treating a zeolitic starting material having a crystalline framework structure containing silicon and aluminum with a fluorogallate salt capable of removing aluminum from the crystalline framework structure and providing gallium ions for introduction of gallium into the framework structure.

2. A method according to claim 1, wherein the molar ratio of silica/alumina in the zeolitic starting material is no more than 1000/1.

3. A method according to claim 2, wherein the molar ratio of silica/alumina in the zeolitic starting material is no more than 500/1.

4. A method according to claim 1, wherein the said treatment is carried out at a pH below 6.7.

5. A method according to claim 1, wherein the fluorogallate salt is water-soluble.

6. A method according to claim 5, wherein the fluorogallate salt is ammonium fluorogallate.

7. A method according to claim 1, wherein the zeolitic starting material contains ammonium ions.

8. A method according to claim 1, which comprises forming a slurry of the zeolitic starting material in an aqueous medium containing the fluorogallate salt, adjusting the pH to a value of from 5 to 8 inclusive and heating to a temperature of from 50° to 95° C. inclusive.

9. A method according to claim 8, wherein the pH is adjusted to a value of from 5 to 6.7.

10. A method according to claim 1, wherein the zeolite material is a wide pore zeolite.

11. A method according to claim 10, wherein the zeolitic material has a faujasitic structure.

12. A method according to claim 10, wherein the zeolite material is of a type selected from the group consisting of X, Y, β, ZSM 20, EM1, EM2 and mordenite.

13. A method according to claim 1, wherein the zeolite material is a medium pore zeolite.

14. A method according to claim 13, wherein the medium pore zeolite is selected from the group consisting of ZSM 5, ZSM 11 and theta-1 zeolite.

15. A method according to claim 8, wherein the gallium containing zeolite material is subjected to the additional steps of washing, drying, combining with a matrix material and calcining to provide an FCC catalyst composition.

16. An aluminosilicate zeolite material having a faujasitic structure of the formula $$[M_{(x+y)/n} [AlO_2]_x [GaO_2]_y [SiO_2]_2] NH_{4(x+y)}(AlO_2)_y(GaO_2)_y(SiO_2)_z$$

wherein x, y and z are the respective numbers of tetrahedra represented respectively by $AlO_2$, $GaO_2$ and $SiO_2$, and $x+y=z=192$, for said faujasitic structure with no missing tetrahedra, $x+y$ is from 0.1 to 71 inclusive, and y is from 0.01 to 60 inclusive.

17. A zeolite material according to claim 16, wherein $x+y$ is from 10 to 56 inclusive and y is from 0.1 to 15 inclusive.

18. A zeolite material, which is zeolite Y containing gallium in the crystalline framework structure and having a unit cell size of at least 24.72 Å.

19. A zeolite material according to claim 18, which has a unit cell size from 24.72 to 24.79 Å inclusive.

20. A zeolite material according to claim 18, which has a unit cell size of from 24.76 to 24.79 Å inclusive.

21. A zeolite material according to claim 16, which is a zeolite Y containing gallium, having a molar ratio of silica/(alumina and gallia) of at least 5/1 and a unit cell size which is from 0.01 to 0.15 Å inclusive greater than a gallium free zeolite having a silica/alumina molar ratio which is the same as the silica/(alumina and gallia) molar ratio of the said gallium containing zeolite Y.

22. An aluminosilicate catalytic material comprising a zeolite material having a faujasitic structure of the formula $$[M_{(x+y)/n} [AlO_2]_x [GaO_2]_y [SiO_2]_2] NH_{4(x+y)}(AlO_2)_y (GaO_2)_y (SiO_2)_z$$

wherein x, y and z are the respective numbers of tetrahedra represented respectively by $AlO_2$, $GaO_2$ and $SiO_2$, and $x+y+z=192$, for said faujasitic structure with no missing tetrahedra, $x+y$ is from 0.1 to 71 inclusive, and y is from 0.01 to 60 inclusive.

23. A catalytic material according to claim 22 suitable for hydrocarbon transformation.

24. A catalytic material according to claim 23 comprising a zeolite material which is calcined and further comprising a matrix binder for the zeolite material and being suitable for FCC.

25. A process for producing gasoline from a hydrocarbon feed, which process comprises subjecting the hydrocarbon feed to catalytic cracking under FCC conditions using an aluminosilicate catalyst comprising a zeolite material having a faujasitic structure of the formula $$[M_{(x+y)} (AlO_2)_x (GaO_2)_y (SiO_2)_z]$$

wherein x, y and z are the respective numbers of tetrahedra represented respectively by $AlO_2$, $GaO_2$ and $SiO_2$, and $x+y+z=192$, for said faujasitic structure with no missing tetrahedra, $x+y$ is from 0.1 to 71 inclusive, and y is from 0.01 to 60 inclusive.

26. A process according to claim 25, wherein the catalyst comprises from 0.1 to 60 wt % of the zeolite material and a matrix binder therefor.

* * * * *